No. 889,763.
PATENTED JUNE 2, 1908.
G. A. CRAM.
PITMAN.
APPLICATION FILED FEB. 1, 1907.
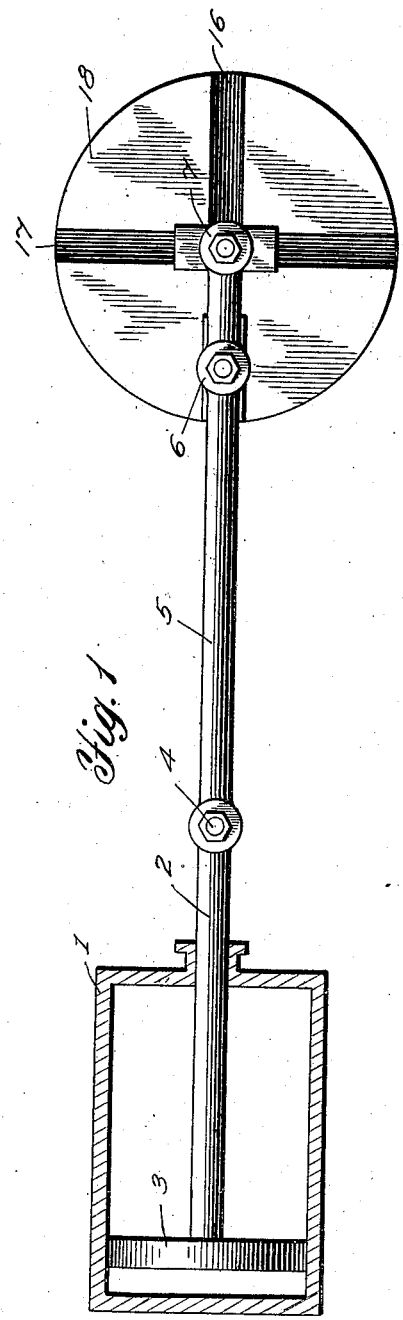
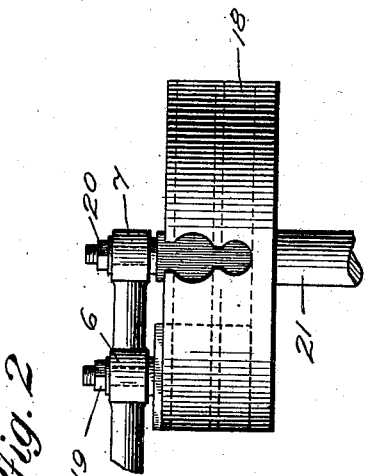
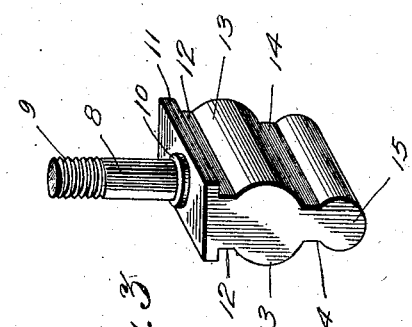
Witnesses
Inventor
George A. Cram
By Victor J. Evans
Attorney

UNITED STATES PATENT OFFICE.

GEORGE A. CRAM, OF ARGENTINE, KANSAS.

PITMAN.

No. 889,763.      Specification of Letters Patent.      Patented June 2, 1908.

Application filed February 1, 1907. Serial No. 355,249.

*To all whom it may concern:*

Be it known that I, GEORGE A. CRAM, a citizen of the United States of America, residing at Argentine, in the county of Wyandotte and State of Kansas, have invented new and useful Improvements in Pitmen, of which the following is a specification.

This invention relates to pitmen, and one of the principal objects of the same is to provide a pitman with oppositely disposed pivoted sliding blocks to engage the crossed grooves in a rotary element to actuate the pitman.

Another object of the invention is to provide the sliding blocks with a plurality of enlargements to insure a smooth operation of the blocks within the grooves of the rotary element.

These and other objects may be attained by means of the construction illustrated in the accompanying drawing, in which:

Figure 1 is a side elevation of a pitman made in accordance with my invention, and showing a cylinder in section with a piston rod connected to the pitman, and the rotary element for reciprocating said rod. Fig. 2 is a plan view of the rotary element, and the sliding blocks engaged in the grooves therein. Fig. 3 is a perspective of one of the sliding blocks.

Referring to the drawing for a more particular description of my invention, the numeral 1 designates a cylinder, and 2 is a piston rod connected to a piston head 3 adapted to be reciprocated in said cylinder. The outer end of the piston rod 2 is pivotally connected, as at 4, to a pitman 5, said pitman being provided with enlarged bosses 6, 7, through which apertures are formed for the shanks of the sliding blocks. The sliding blocks each comprise a shank having a smooth unthreaded portion 8, and a threaded portion 9. At the base of the shank 8 an annular enlargement 10 is provided and a rectangular flange 11 is formed upon the slide immediately above the oppositely disposed grooves 12.

Under the groove 12 at opposite sides of the block an enlargement 13 of substantially circular section is provided, and under the enlargement 13 oppositely disposed grooves 14 are formed, the end of the block terminating in a substantially cylindrical portion 15.

The sliding blocks are of substantially identical structure, and they are fitted into the crossed grooves 16, 17 of the rotary element 18, said grooves being of a form to inclose the blocks from the flange 11 to the terminal rounded portion 15, the flanges 11 serving to have a sliding movement on the opposite upper surfaces of the element while the grooves 12 adjacent to the flanges serve to engage the edges of the cross-grooves, as shown more clearly in Fig. 2 of the drawing. The unthreaded portion 8 of the shank is fitted in the bosses 6, 7 of the pitman 5, and nuts 19 and 20 are turned upon the threaded portion 9 of the shanks. A driven shaft 21 is secured to the rotary element 18, and said shaft is rotated by any suitable power.

The sliding blocks, being provided with two enlargements, insure the smooth operation of said blocks since they are held in vertical alinement or at right angles to the slots or grooves 16 in the rotary element.

Having thus described the invention, what I claim is:

A structure of the character described comprising a rod, blocks connected to said rod, and a rotary element having cross grooves therein constructed in shape to the cross sectional contour of the blocks, each of said blocks being provided on its opposite sides with flanges, having adjacent channels and further with semi-circular enlargements having adjacent channels, the terminals of the blocks being substantially cylindrical, said flanges serving to slidably engage the opposite upper surfaces of the said element, and said channels adjacent to the flanges serving to slidably engage the edges of the cross grooves of the rotary element, substantially as specified.

In witness whereof, I affix my signature in presence of two witnesses.

GEORGE A. CRAM.

Witnesses:
JAMES KANE,
E. WRIGHT.